US007299684B2

United States Patent
Wu et al.

(10) Patent No.: US 7,299,684 B2
(45) Date of Patent: Nov. 27, 2007

(54) AUTOMATED TOOL AND WORKSPACE ANALYSIS

(75) Inventors: Wen-Jun Wu, Novi, MI (US); Jonathan C. Ostling, Auburn Hills, MI (US)

(73) Assignee: Chrysler LLC, Auburn Hills, MI (US)

( * ) Notice: Subject to any disclaimer, the term of this patent is extended or adjusted under 35 U.S.C. 154(b) by 573 days.

(21) Appl. No.: 10/826,607

(22) Filed: Apr. 16, 2004

(65) Prior Publication Data
US 2005/0246047 A1 Nov. 3, 2005

(51) Int. Cl.
*G01M 1/00* (2006.01)
(52) U.S. Cl. .................................... 73/65.01
(58) Field of Classification Search ............. 73/65.01
See application file for complete search history.

(56) References Cited
U.S. PATENT DOCUMENTS 3,593,605 A * 7/1971 Cudnohufsky ............... 82/165
5,301,544 A * 4/1994 Smith ....................... 73/65.07
5,528,927 A * 6/1996 Butler et al. ............... 73/65.03
5,929,459 A * 7/1999 Bocchicchio et al. .. 250/559.34
6,053,033 A * 4/2000 Kuhlmann et al. ........ 73/65.01
6,161,744 A * 12/2000 Mukoyama et al. ........... 227/8
6,817,111 B1 * 11/2004 Corrado ....................... 33/632

* cited by examiner

Primary Examiner—Michael Cygan
Assistant Examiner—Octavia Davis
(74) Attorney, Agent, or Firm—Ralph E. Smith

(57) ABSTRACT

An automated tool installation and workspace analysis method determines an axis of a fastener in order to determine positioning a fastener actuating tool. A center of gravity of the fastener is determined. The axis of the fastener is calculated based in part on the center of gravity. Additionally, the axis of the fastener is calculated based on distances between vertices of the fastener and an initial assumed axis of the fastener. Once the axis of the fastener is determined, the positioning of the tool can be determined.

10 Claims, 5 Drawing Sheets

AUTOMATED TOOL AND WORKSPACE ANALYSIS

FIELD OF THE INVENTION

The present invention relates to determining dimensions of mechanical parts, and more particularly to determining part dimensions for part relocation and orientation and creation and evaluation of available tool usage workspace.

BACKGROUND OF THE INVENTION

Workspace in mechanical environments may be limited due to the complexity and quantity of mechanical parts. This is especially true in automotive applications. Workspace limitations can cause difficulty in manipulating and relocating parts during initial installation, testing, and repair. Additionally, the design and engineering of the environment is hindered due to workspace constraints.

In particular, it can be difficult determining locations of certain parts, such as mechanical fasteners, due to lack of foresight as to the tools necessary to position the fasteners. For example, although it may visually appear that a fastener is appropriate in a particular location, workspace limitations may prevent the fastener from being installed or removed with proper or standard tools.

SUMMARY OF THE INVENTION

An automated tool installation and workspace analysis method comprises calculating a center of gravity of a fastener. An axis of the fastener is determined based at least partially on the center of gravity. A position of a tool is determined according to the axis of the fastener.

In another aspect of the invention, the axis of the fastener is determined by assuming an initial axis of the fastener. The initial axis is rotated along various axes of the global coordinate system. The distances between the vertices of the fastener and the initial axis is determined. The initial axis is updated based on the distances between the vertices and the rotated initial axis.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
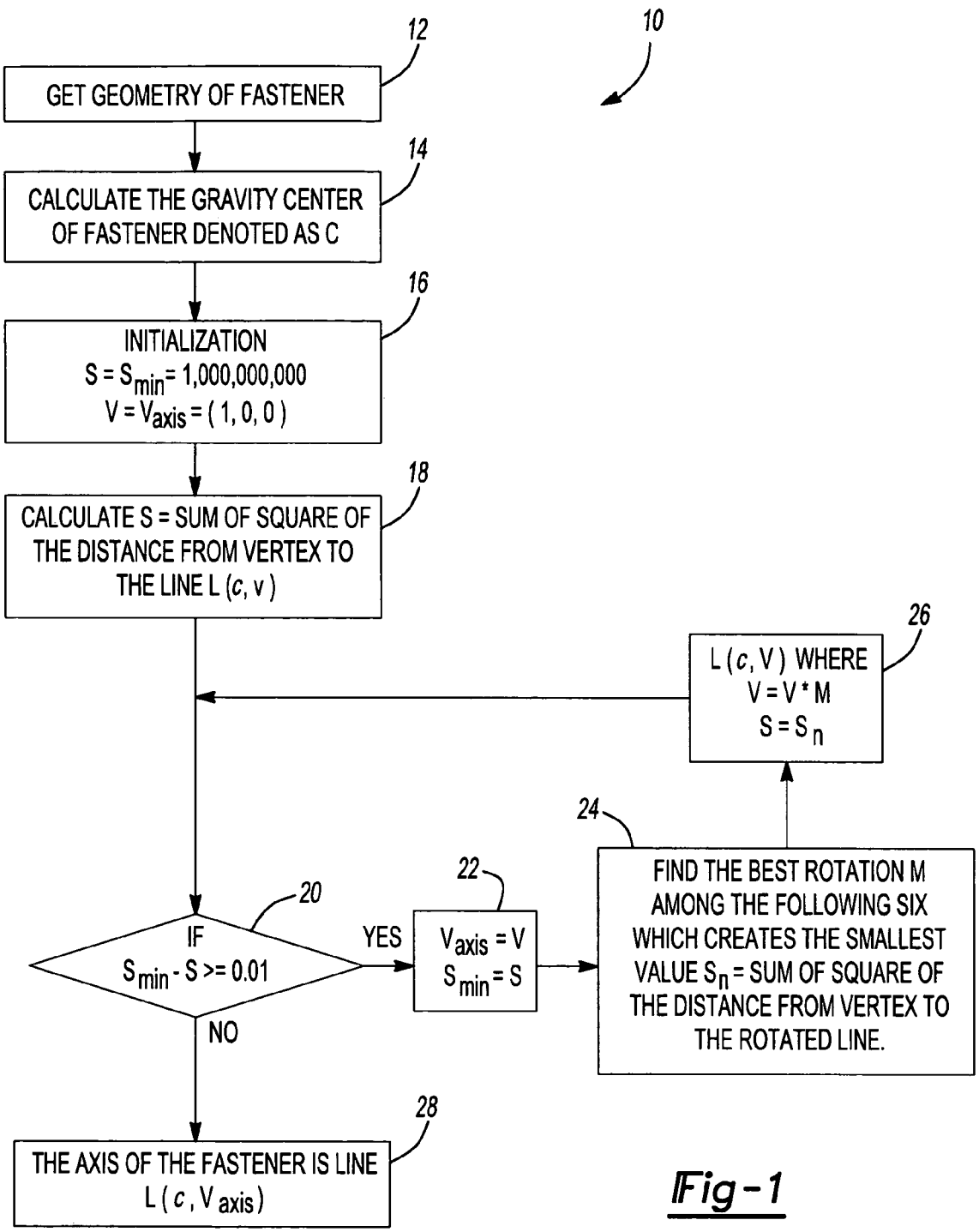
FIG. 1 is a flow diagram of an automated tool installation and workspace analysis algorithm according to the present invention.

An automated tool installation and workspace analysis algorithm 10 is shown in FIG. 1. At step 12, the algorithm 10 determines a geometry of a selected fastener as it exists in an environment. The geometry of the fastener includes, but is not limited to, vertices of the fastener and other dimensions related to a triangle mesh representation of the fastener as is known in the art. In the present application, the fastener may be a nut, bolt, screw, rivet, or other suitable fastener. The fastener may be a separate item or could form a portion of a component, such as a spark plug. Once the geometry of the fastener is determined, the algorithm 10 calculates the center of gravity c of the fastener at step 14. The algorithm 10 uses the center of gravity to determine the axis of the fastener.

The algorithm 10 assumes an initial axis of the fastener at step 16. In the preferred embodiment, the algorithm 10 assumes an initial axis direction of $V=V_{axis}=(1, 0, 0)$, or a direction parallel to the x-axis. However, other initial axes are possible. Additionally at step 16, the algorithm 10 sets an initial value of $S=S_{min}=1,000,000,000$. Although the preferred embodiment uses an initial value of 1,000,000,000, it is to be understood that this value is fairly arbitrary and any suitably large value is possible. The purpose of the variables S and $S_{min}$ are described in more detail below.

At step 18, the algorithm 10 calculates S. S is the sum of the squares of the distances from each vertex to the line L(c, V), or a line through the center of gravity c having a direction $V=(1, 0, 0)$. At step 20, the algorithm 10 subtracts S from the initial $S_{min}$ of 1,000,000,000. Initially, S will be large because the assumed V of (1, 0, 0) will be inaccurate, resulting in relatively large distances from each vertex of the fastener to the line L(c, V). If $S_{min}-S$ is greater than or equal to 0.01, or any other suitable nominal value, the algorithm 10 continues to step 22. The preferred embodiment assumes that $S_{min}-S$ is initially larger than 0.01 because of the initial value of 1,000,000,000. At step 22, the algorithm sets $V_{axis}$ equal to V and $S_{min}$ equal to S. Therefore, during a first iteration, $V_{axis}$ remains at (1, 0, 0) and $S_{min}$ is set according to the value calculated at step 18.

At step 24, the algorithm 10 calculates $S_n$, where n represents one of six possible rotations M. To calculate each value $S_n$, the algorithm 10 rotates the initial line L(c, V) along one of the axes (1, 0, 0), (−1, 0, 0), (0, 1, 0), (0, −1, 0), (0, 0, 1), and (0, 0, −1). In other words, the algorithm 10 rotates the initial line L(c, V) one degree in each direction along the x axis, the y axis, and the z axis, for six possible rotations M. For each rotation M, the algorithm 10 calculates the values $S_n$ as the sum of the squares of the distances from each vertex of the fastener to the rotated line. The algorithm 10 selects the rotation M that resulted in the smallest value $S_n$. In other words, the algorithm 10 selects the rotation M that results in a calculated axis that is closest to the actual axis of the fastener.

At step 26, the algorithm 10 updates the line L(c, V) where V=V*M, or V adjusted by the rotation M resulting in the smallest value $S_n$. The algorithm 10 also updates S with the smallest $S_n$ from step 24. The algorithm 10 returns to step 20 to recalculate $S_{min}-S$, where $S_{min}$ is the value from the previous iteration of step 22. In the second iteration of step 20, S will still be large, and therefore will be significantly larger than 0.01. However, it can be seen that the value of S will continually decrease as steps 20 through 26 are repeated and the line L(c, V) is rotated. In this manner, the algorithm 10 will eventually arrive at a value S where $S_{min}$–S is less than 0.01. In other words, the algorithm 10 will rotate the line L(c, V) iteratively until the correct axis V is found. When $S_{min}$–S is less than 0.01, the algorithm 10 continues to step 28. At step 28, the algorithm 10 finalizes the axis of the fastener as the line L(c, V).

Figure 2:
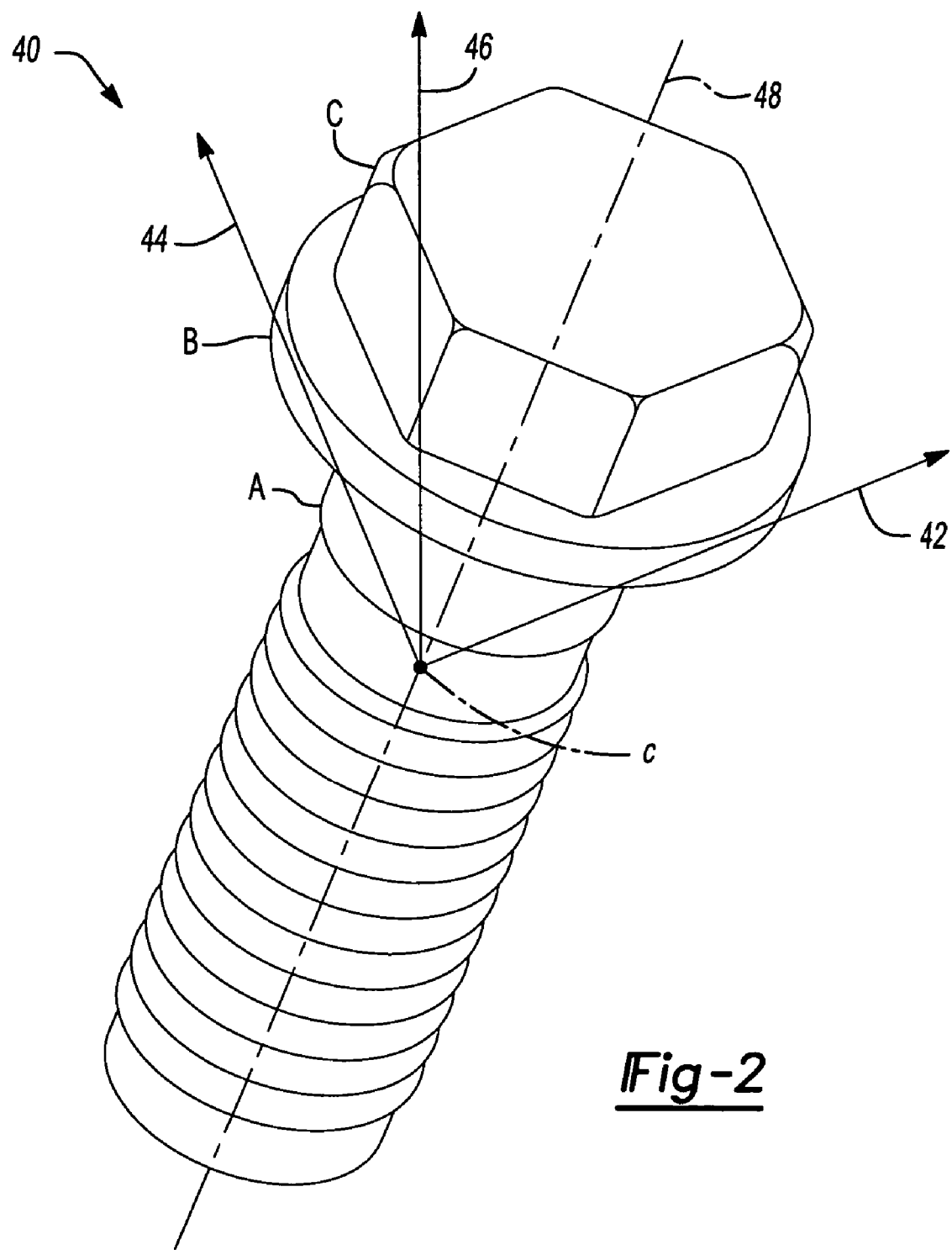
FIG. 2 illustrates fastener dimensioning according to the present invention.

The analysis of the algorithm 10 is further described with respect to a fastener 40 in FIG. 2. The geometry of the fastener 40 includes vertices such as A, B, and C. The center of gravity of the fastener is indicated at c. The algorithm 10 assumes an initial axis L(c, V) where V=(1, 0, 0) and as indicated by initial axis 42, which is also the x-axis. The initial value S is the sum of the square of the distances from vertex A to initial axis 42, from vertex B to initial axis 42, and from vertex C to initial axis 42. Although only three vertices are identified, it is to be understood that other vertices are present. The algorithm 10 rotates the initial axis 42 incrementally along the x-axis 42, the y-axis 44, and the z-axis 46 until $S_{min}$–S is less than 0.01 as described in FIG. 1. In this manner, the algorithm 10 calculates the actual axis 48 of the fastener 40.

Figure 3:
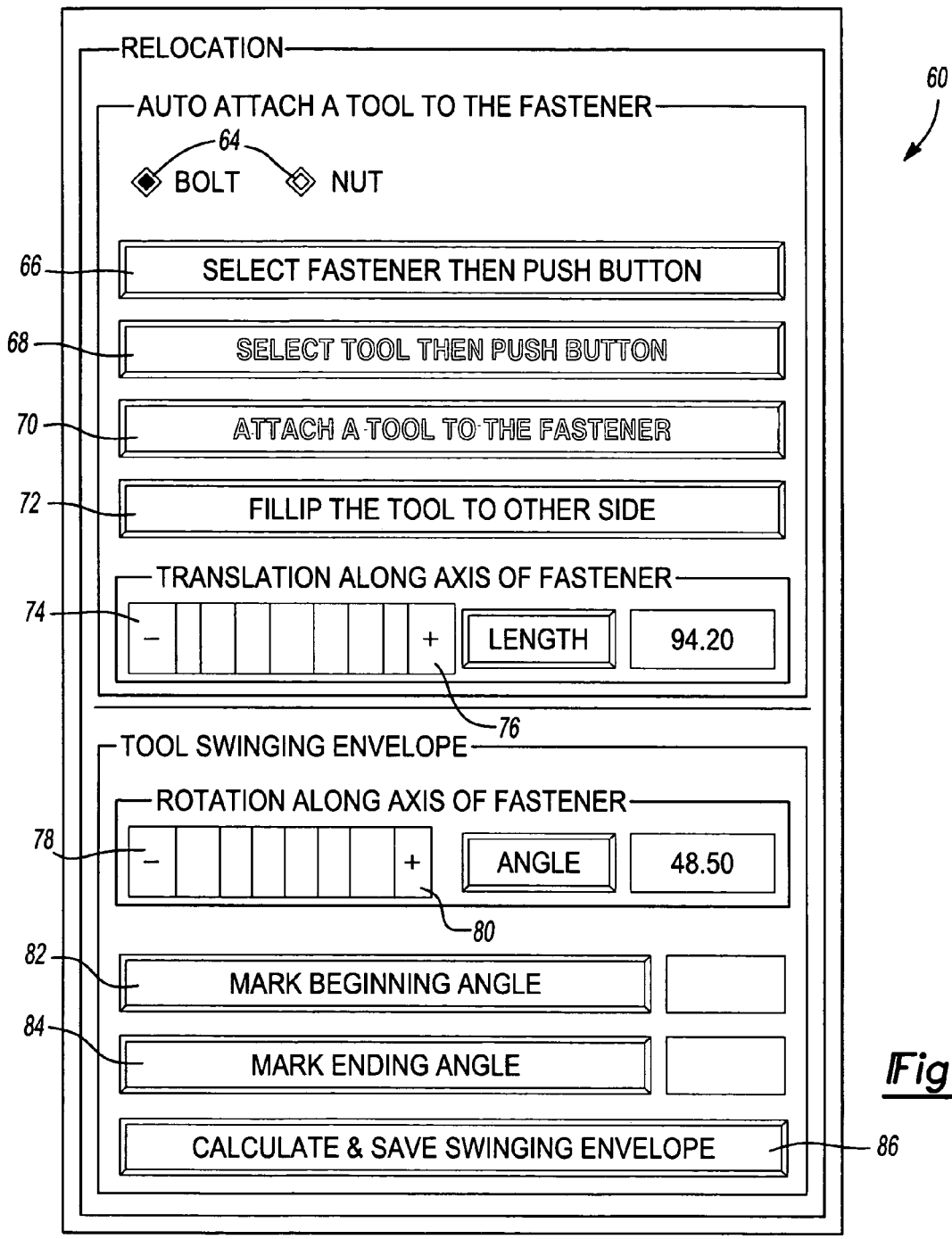
FIG. 3 illustrates an exemplary user interface according to the present invention.
Figure 4:
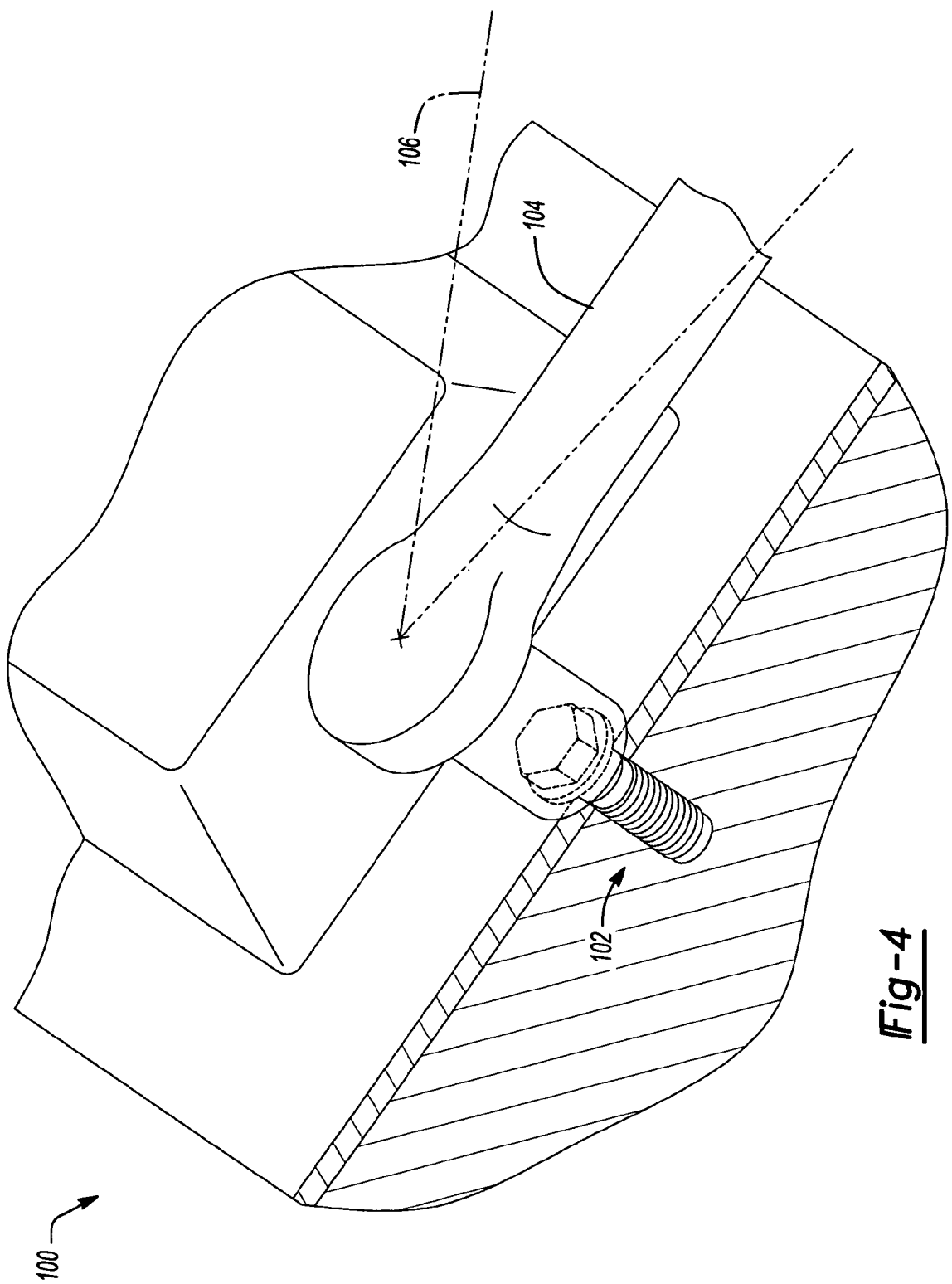
FIG. 4 illustrates a fastener and a tool in a workspace environment according to the present invention.

An exemplary user interface 60 used to implement the algorithm 10 of FIG. 1 is shown in FIG. 3. In the preferred embodiment, the user interface 60 is used in conjunction with a graphical representation, such as a Conception Rendering System (CRS) representation 100, of one or more fasteners 102 and a tool 104 in a workspace environment as shown in FIG. 4. The user selects from among fastener buttons 64 according to a desired fastener type. Although only bolt and nut fasteners are shown, it is to be understood that other suitable fastener types are possible. The user then selects the desired fastener from the CRS representation 100 and selects a select fastener button 66 to load the desired fastener into the algorithm. The user loads one or more desired tools 104 into the CRS representation 100 and selects the tool 104. The user then selects a select tool button 68 to load the desired tool into the algorithm. The user selects an attach tool button 70 in order to run the algorithm and calculate the axis of the selected fastener 102. When the algorithm is complete, the appropriate position of the tool 104 can be determined according to the axis of the selected fastener 102.

The user interface 60 may be used to manipulate the CRS representation 100 based on the axis of the fastener 102 and the tool position. For example, the user may select a flip button 72 to flip the tool 104 to the other side of the selected fastener 102. The user may translate the tool 104 along the axis of the fastener 102 by selecting translation buttons 74 or 76. The user may create a tool-swinging envelope 106 as shown in FIG. 4. The user rotates the tool 104 by selecting rotate buttons 78 and 80. The user marks a beginning angle by selecting a mark beginning angle button 82 and marks an ending angle by selecting a mark ending angle button 84. The user selects a calculate envelope button 86 and the tool-swinging envelope 106 is generated. The user can visually determine the rotational possibilities of the tool based on the tool-swinging envelope 106 in the workspace environment as shown in FIG. 4. At this point, the user may determine whether the available tool positioning workspace meets the criteria for enabling successful installation or removal of the fastener. For example, the user may determine an available angle or rotation of the tool and check whether the available angle is sufficient.

Figure 5:
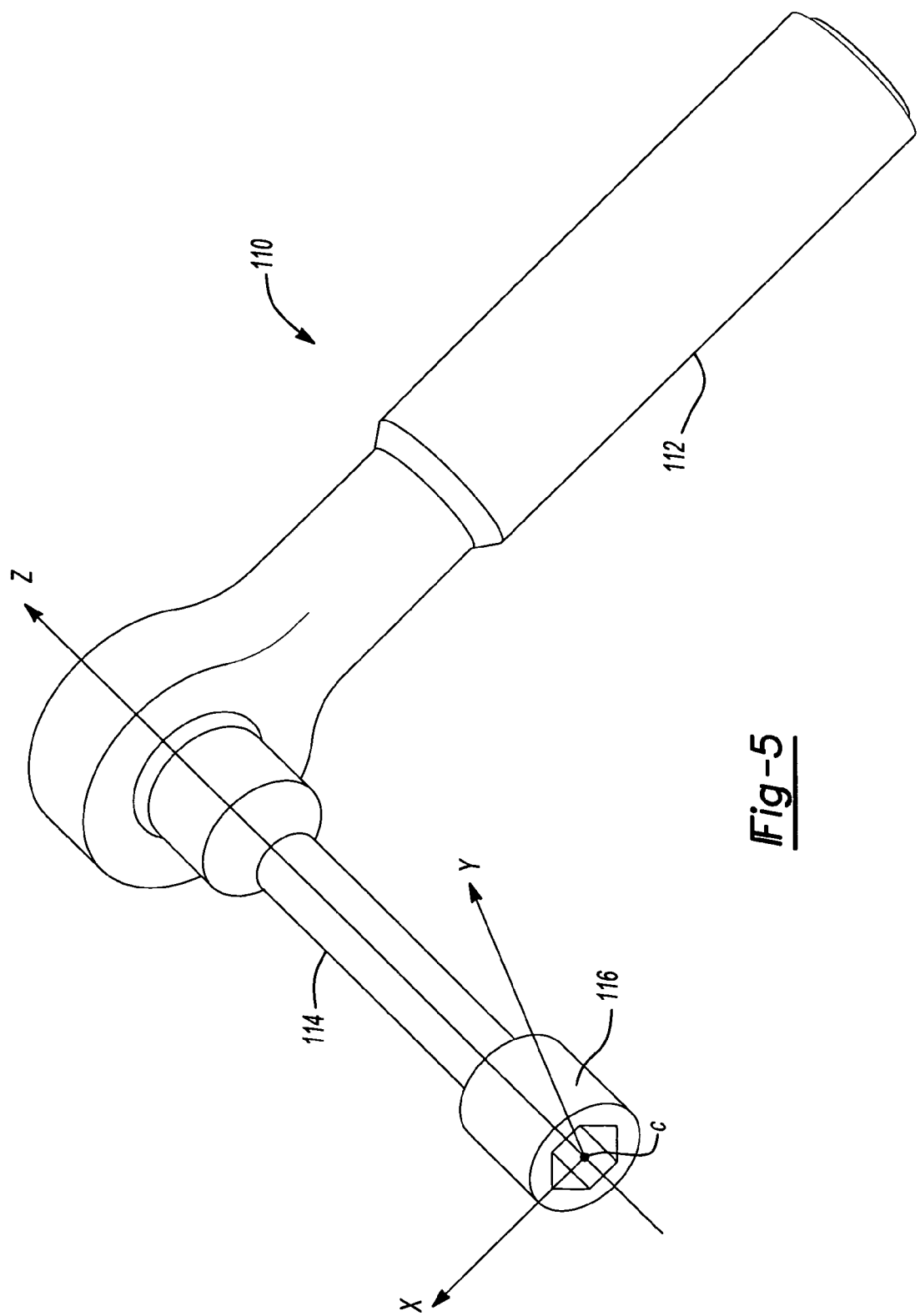
FIG. 5 illustrates tool positioning according to the present invention.

The position of the tool 110 is determined as shown in FIG. 5. The tool 110 includes a handle 112, an extension 114, and a socket 116. Initially, the tool 110 is loaded into the environment so that the socket 116 and extension 114 are oriented along a line L(c, V), where c is the origin of the global coordinate system and V=(0, 0, 1). In this manner, the axis and orientation of the tool 110 is already known so no additional calculation is necessary. The user can then attach the tool 110 to the fastener by rotating and translating the tool 110 accordingly. It will be apparent to those skilled in the art that many other types of fastening tools, such as screwdrivers or other wrench types, may be analyzed with the invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An automated tool installation and workspace analysis method comprising:
    calculating a center of gravity of a fastener;
    determining an axis of the fastener based at least partially on the center of gravity; and
    determining positioning of a fastener actuating tool according to the axis of the fastener.

2. The method of claim 1 wherein determining the axis includes determining the axis based on a relationship between an initial axis and vertices of the fastener.

3. The method of claim 1 wherein determining the axis includes:
    assuming an initial axis;
    rotating the initial axis; and
    adjusting the initial axis based on a relationship between the initial axis and vertices of the fastener.

4. The method of claim 3 wherein the assuming includes assuming an initial axis of L(c, V), where c is the center of gravity of the fastener, V is (1, 0, 0), and L is a line through c having direction V.

5. The method of claim 3 wherein the rotating includes rotating the initial axis in at least one direction about at least one axis.

6. The method of claim 4 wherein the relationship is a distance between each vertex and the line L(c, V).

7. The method of claim 1 further comprising rotating the tool about the axis to determine a tool-rotation envelope.

8. A graphical user interface that implements the method of claim 1.

9. An automated tool installation end workspace analysis method comprising:
    calculating a center of gravity of a fastener;
    determining an axis of the fastener based at least partially on the center of gravity and thereby determining a position for an actuating tool to actuate said fastener as a function of said axis of the fastener;
    positioning said actuating tool according to said position and determining rotation of said actuating tool within the workspace; and
    evaluating said actuating tool based on said rotation of said actuating tool and said position.

10. The method of claim 9 wherein said actuating tool comprises a wrench that actuates said fastener by rotating so that said fastener fastens to the workspace.

* * * * *